(12) United States Patent
De Wit

(10) Patent No.: US 8,034,870 B2
(45) Date of Patent: *Oct. 11, 2011

(54) FLAME-RETARDANT POLYESTER COMPOSITION

(75) Inventor: Gerrit De Wit, Ossendrecht (NL)

(73) Assignee: Sabic Innovative Plastics IP B.V. (NL)

( * ) Notice: Subject to any disclaimer, the term of this patent is extended or adjusted under 35 U.S.C. 154(b) by 772 days.

This patent is subject to a terminal disclaimer.

(21) Appl. No.: 11/012,800

(22) Filed: Dec. 15, 2004

(65) Prior Publication Data

US 2005/0137297 A1 Jun. 23, 2005

Related U.S. Application Data

(60) Provisional application No. 60/530,147, filed on Dec. 17, 2003.

(51) Int. Cl.
| | |
|---|---|
| *B01F 17/00* | (2006.01) |
| *C08K 5/34* | (2006.01) |
| *C08K 3/18* | (2006.01) |
| *C08K 3/00* | (2006.01) |
| *C08G 18/48* | (2006.01) |
| *C08G 18/77* | (2006.01) |
| *C08G 67/02* | (2006.01) |
| *B32B 7/12* | (2006.01) |
| *C07F 9/48* | (2006.01) |
| *C08F 283/02* | (2006.01) |
| *C08J 3/22* | (2006.01) |

(52) U.S. Cl. ........ 524/513; 524/601; 524/100; 524/196; 524/186; 524/115; 524/126; 524/612; 524/451; 524/430; 524/424

(58) Field of Classification Search .................. 524/101, 524/609, 100, 601, 196, 186, 115, 126, 612, 524/513, 451, 430, 424; 252/100, 124, 125, 252/126, 133, 135, 414, 140, 141, 145, 147

See application file for complete search history.

(56) References Cited

U.S. PATENT DOCUMENTS

| | | | |
|---|---|---|---|
| 2,071,250 | A | 2/1937 | Carothers |
| 2,071,251 | A | 2/1937 | Carothers |
| 2,130,523 | A | 9/1938 | Carothers |
| 2,130,948 | A | 9/1938 | Carothers |
| 2,241,322 | A | 5/1941 | Hanford |
| 2,312,966 | A | 3/1943 | Hanford |
| 2,465,319 | A | 3/1949 | Whinfield et al. |
| 2,512,606 | A | 6/1950 | Bolton et al. |
| 2,720,502 | A | 10/1955 | Caldwell |
| 2,727,881 | A | 12/1955 | Caldwell et al. |
| 2,822,348 | A | 2/1958 | Haslam |
| 3,047,539 | A | 7/1962 | Pengilly |
| 3,078,254 | A | 2/1963 | Zelinski |
| 3,224,043 | A | 12/1965 | Lameris et al. |
| 3,265,765 | A | 8/1966 | Holden et al. |
| 3,297,793 | A | 1/1967 | Dollinger |
| 3,302,243 | A | 2/1967 | Ludwig |
| 3,402,159 | A | 9/1968 | Hsieh |
| 3,405,198 | A | 10/1968 | Rein et al. |
| 3,594,452 | A | 7/1971 | De La Mare et al. |
| 3,671,487 | A | 6/1972 | Abolins |
| 3,769,260 | A | 10/1973 | Segal |
| 3,864,428 | A | 2/1975 | Nakamura et al. |
| 3,915,608 | A | 10/1975 | Hujik |
| 3,953,394 | A | 4/1976 | Fox et al. |
| 3,953,404 | A | 4/1976 | Borman |
| 4,096,156 | A | 6/1978 | Freudenberger et al. |
| 4,119,607 | A | 10/1978 | Gergen et al. |
| 4,128,526 | A | 12/1978 | Borman |
| 4,141,927 | A * | 2/1979 | White et al. .................. 525/432 |
| 4,154,775 | A | 5/1979 | Axelrod |
| 4,172,859 | A | 10/1979 | Epstein |
| 4,180,494 | A | 12/1979 | Fromuth et al. |
| 4,254,011 | A | 3/1981 | Bier |
| 4,264,487 | A | 4/1981 | Fromuth et al. |
| 4,292,233 | A | 9/1981 | Binsack et al. |
| 4,327,764 | A | 5/1982 | Biederman et al. |
| 4,364,280 | A | 12/1982 | Kutsay |
| 4,504,613 | A | 3/1985 | Abolins et al. |
| 4,506,043 | A | 3/1985 | Ogawa et al. |
| 4,940,745 | A | 7/1990 | Lausberg et al. |
| 4,954,540 | A | 9/1990 | Nakane et al. |
| 4,983,660 | A | 1/1991 | Yoshida et al. |
| 5,302,645 | A | 4/1994 | Nakano et al. |
| 5,326,806 | A | 7/1994 | Yokoshima et al. |
| 5,385,970 | A * | 1/1995 | Gallucci et al. ............... 524/538 |
| 5,684,071 | A * | 11/1997 | Mogami et al. ............... 524/100 |
| 5,955,565 | A | 9/1999 | Morris et al. |

(Continued)

FOREIGN PATENT DOCUMENTS

DE 19904814 8/2000

(Continued)

OTHER PUBLICATIONS

STN Search Report pp. 1-3.* Cooper, et al., "Life Cycle Engineering Guidelines," EPA 600/R-01/101, Risk Management Research, pp. 1-100 (2001).
ASTM Designation: D 256-06, "Standard Test Methods for Determining the Izod Pendulum Impact Resistance of Plastics," pp. 1-20 (2006).
ASTM Designation: D 648-06, "Standard Test Method for Deflection Temperature of Plastics Under Flexural Load in the Edgewise Position," pp. 1-13 (2006).
International Standard: ISO 180, "Plastics—Determination of Izod Impact Strength," pp. 1-16 (2000).
International Standard: ISO 527-1, "Plastics—Determination of Tensile Properties," pp. 1-54 (1993).
UL 94, "Tests for Flammability of Plastic Materials for Parts in Devices and Appliances," 52 pgs., (Dec. 12, 2003).
International Seach Report & Written Opinion, International Application No. PCT/US2008/066599, International Filing Date Jun. 11, 2008, mailed Mar. 2, 2009, 7 pages.

(Continued)

*Primary Examiner* — Basia Ridley
*Assistant Examiner* — Alexander Kollias
(74) *Attorney, Agent, or Firm* — Cantor Colburn LLP; Diderico van Eyl

(57) ABSTRACT

A composition, comprising: a poly(butylene terephthalate); a nitrogen-containing flame retardant selected from the group consisting of triazines, guanidines, cyanurates, isocyanurates, and mixtures comprising at least one of the foregoing nitrogen-containing flame retardants; a phosphinates or diphosphinates; and a charring polymer.

27 Claims, No Drawings

U.S. PATENT DOCUMENTS

| | | | |
|---|---|---|---|
| 6,013,707 | A | 1/2000 | Kleiner et al. |
| 6,068,935 | A | 5/2000 | Hayami et al. |
| 6,111,031 | A | 8/2000 | Puyenbroek et al. |
| 6,150,473 | A | 11/2000 | Brown et al. |
| 6,166,114 | A | 12/2000 | Cosstick et al. |
| 6,255,371 | B1* | 7/2001 | Schlosser et al. ............ 524/100 |
| 6,410,607 | B1 | 6/2002 | Ekart et al. |
| 6,420,459 | B1* | 7/2002 | Horold .......................... 523/451 |
| 6,429,243 | B1 | 8/2002 | Okamoto et al. |
| 6,444,283 | B1 | 9/2002 | Turner et al. |
| 6,469,095 | B1 | 10/2002 | Gareiss et al. |
| 6,503,988 | B1 | 1/2003 | Kitahara et al. |
| 6,531,530 | B2* | 3/2003 | Asano ........................... 524/414 |
| 6,538,054 | B1 | 3/2003 | Klatt et al. |
| 6,547,992 | B1 | 4/2003 | Schlosser et al. |
| 6,569,928 | B1 | 5/2003 | Levchik et al. |
| 6,794,463 | B2 | 9/2004 | Aramaki et al. |
| 7,063,889 | B2 | 6/2006 | Yoshida et al. |
| 7,105,589 | B2 | 9/2006 | Geprags |
| 7,169,836 | B2 | 1/2007 | Harashina et al. |
| 7,498,368 | B2 | 3/2009 | Harashina et al. |
| 2001/0007888 | A1 | 7/2001 | Asano |
| 2001/0009944 | A1* | 7/2001 | Chisholm et al. ............ 524/494 |
| 2002/0096669 | A1 | 7/2002 | Van Der Spek et al. |
| 2002/0111403 | A1* | 8/2002 | Gosens et al. ................ 524/101 |
| 2002/0123566 | A1 | 9/2002 | Georgiev et al. |
| 2002/0134771 | A1 | 9/2002 | Wenger et al. |
| 2003/0018107 | A1 | 1/2003 | Heinen et al. |
| 2004/0072929 | A1 | 4/2004 | De Schryver |
| 2004/0192812 | A1 | 9/2004 | Engelmann et al. |
| 2005/0137297 | A1 | 6/2005 | De Wit |
| 2005/0137300 | A1 | 6/2005 | Schlosser et al. |
| 2005/0143503 | A1 | 6/2005 | Bauer et al. |
| 2005/0154099 | A1 | 7/2005 | Kobayashi et al. |
| 2005/0191483 | A1 | 9/2005 | Yoshida et al. |
| 2005/0272839 | A1 | 12/2005 | Bauer et al. |
| 2006/0058431 | A1 | 3/2006 | Cartier et al. |
| 2006/0084734 | A1 | 4/2006 | Bauer et al. |
| 2006/0247339 | A1 | 11/2006 | Harashina et al. |
| 2007/0049667 | A1 | 3/2007 | Kim et al. |
| 2007/0161725 | A1 | 7/2007 | Janssen |
| 2008/0090950 | A1 | 4/2008 | Costanzi et al. |
| 2008/0139711 | A1 | 6/2008 | Borade et al. |
| 2008/0242789 | A1 | 10/2008 | Zhu et al. |
| 2008/0269383 | A1 | 10/2008 | Pauquet et al. |
| 2009/0124733 | A1 | 5/2009 | Haruhara et al. |
| 2009/0203871 | A1 | 8/2009 | Maruyama et al. |

FOREIGN PATENT DOCUMENTS

| | | |
|---|---|---|
| EP | 0146104 A2 | 6/1985 |
| EP | 0672717 A1 | 9/1995 |
| EP | 0899303 A2 | 3/1999 |
| EP | 0919591 | 6/1999 |
| EP | 1024168 | 8/2000 |
| EP | 1070754 | 1/2001 |
| EP | 1967549 A1 | 9/2008 |
| EP | 1967549 A1 | 10/2008 |
| GB | 1264741 | 2/1972 |
| JP | 4-345655 A | 12/1992 |
| JP | 4345655 A | 12/1992 |
| WO | WO 99/02606 | 1/1999 |
| WO | 9965987 | 12/1999 |
| WO | 2000/49077 A1 | 8/2000 |
| WO | 0121698 | 3/2001 |
| WO | 01/81470 A1 | 11/2001 |
| WO | 2005059018 A1 | 6/2005 |
| WO | 2007/084538 A2 | 7/2007 |
| WO | 2008/011940 A1 | 1/2008 |
| WO | 2008/014254 A2 | 1/2008 |
| WO | 2008/014273 A1 | 1/2008 |

OTHER PUBLICATIONS

International Search Report & Written Opinon, International Application No. PCT/US2008/066603, International Filing Date Jun. 11, 2008, Date of Mailing Mar. 12, 2009; 13 pages.

International Search Report & Written Opinion, International Application No. PCT/US2004/042202; International Filing Date Dec. 16, 2004; Date of Mailing Mar. 9, 2005; 12 pages.

International Preliminary Report on Patentability & Written Opinion, International Application No. PCT/US2004/042202; International Filing Date Dec. 16, 2004; Date of Mailing Jun. 20, 2006; 5 pages.

Chemical Processing, [online]; [retrieved on Oct. 14, 2009]; retrieved from the Internet http://www.chemicalprocessing.com/industrynews/2006/056.html Article: "GE gives plastic bottle recycling a new spin," Chemical Processing.com, Aug. 26, 2006, 2pgs.

ASTM D256-04; Standard Test Methods for Determining the Izod Pendulum Impact Resistance of Plastics.

* cited by examiner

FLAME-RETARDANT POLYESTER COMPOSITION

CROSS REFERENCE TO RELATED APPLICATIONS

This application claims priority to U.S. Provisional Application Ser. No. 60/530,147 filed on Dec. 17, 2003, which is incorporated herein by reference in its entirety.

BACKGROUND

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardancy to polyesters. One particular set of conditions commonly accepted and used as a standard for flame retardancy is set forth in Underwriters Laboratories, Inc. Bulletin 94, which prescribes certain conditions by which materials are rated for self-extinguishing characteristics. Another set of conditions commonly accepted and used (especially in Europe) as a standard for flame retardancy is the Glow Wire Test (GWT), performed according to the International standard IEC 695-2-1/2. Numerous flame-retardants for polyesters are known, but many contain halogens, usually bromine. Halogenated flame retardant agents are less desirable because of the increasing demand for ecologically friendly ingredients. Halogen-free flame-retardants as Phosphorus and Nitrogen based compounds can be used as well, but they are lacking good flame retardancy for thin sections.

There is a need for polyester compositions having the combination of good flame retardant properties not only at thick nesses of >1.5 mm, but also at thick nesses at 0.8 mm or less and at least essentially maintaining mechanical properties and/or heat properties.

SUMMARY

One or more of the above described drawbacks and disadvantages can be alleviated or minimized by a composition comprising: a polyester; a nitrogen-containing flame retardant selected from the group consisting of at least one of a triazine, a guanidine, a cyanurate, an isocyanurate, and mixtures thereof, a phosphinic acid salt and/or diphosphinic acid salt and/or their polymers; and a charring polymer.

Other embodiments, including a method of preparing the compositions, are described below.

DETAILED DESCRIPTION OF THE PREFERRED EMBODIMENTS

According to an embodiment, a composition comprises a polyester such as a poly(butylene terephthalate); a nitrogen-containing flame retardant selected from the group consisting of at least one of a triazine, a guanidine, a cyanurate, an isocyanurate, and mixtures thereof, a phosphinic acid salt and/or diphosphinic acid salt and/or their polymers as described below; and a charring polymer.

Preferred polyesters are obtained by copolymerizing a glycol component and an acid component comprising at least about 70 mole %, preferably at least about 80 mole %, of terephthalic acid, or polyester-forming derivatives thereof. The preferred glycol, tetramethylene glycol, component can contain up to about 30 mole %, preferably up to about 20 mole % of another glycol, such as ethylene glycol, trimethylene glycol, 2-methyl-1,3-propane glycol, hexamethylene glycol, decamethylene glycol, cyclohexane dimethanol, neopentylene glycol, and the like, and mixtures comprising at least one of the foregoing glycols. The preferred acid component may contain up to about 30 mole %, preferably up to about 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethanedicarboxylic acid, sebacic acid, adipic acid, and the like, and polyester-forming derivatives thereof, and mixtures comprising at least one of the foregoing acids or acid derivatives.

A preferred polyester can have a number average molecular weight of about 10,000 atomic mass units (AMU) to about 200,000 AMU, as measured by gel permeation chromatography using polystyrene standards. Within this range, a number average molecular weight of at least about 20,000 AMU is preferred. Also within this range, a number average molecular weight of up to about 100,000 AMU is preferred, and a number average molecular weight of up to about 50,000 AMU is more preferred.

The polyester can be present in the composition at about 20 to about 90 weight percent, based on the total weight of the composition. Within this range, it is preferred to use at least about 25 weight percent, even more preferably at least about 30 weight percent of the polyester such as poly(butylene terephthalate).

In a further embodiment the composition can contain a second polyester resin that is different from the first polyester. For the second polyester, suitable resins include those derived from a $C_2$-$C_{10}$ aliphatic or cycloaliphatic diol, or mixtures thereof, and at least one aromatic dicarboxylic acid. Preferred polyesters are derived from an aliphatic diol and an aromatic dicarboxylic acid having repeating units of the following general formula (1):

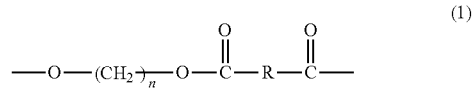

(1)

wherein n is an integer of from 2 to 6, and R is a $C_6$-$C_{20}$ divalent aryl radical comprising a decarboxylated residue derived from an aromatic dicarboxylic acid.

Examples of aromatic dicarboxylic acids represented by the decarboxylated residue R are isophthalic acid, terephthalic acid, 1,2-di(p-carboxyphenyl)ethane, 4,4'-dicarboxydiphenyl ether, 4,4'-bisbenzoic acid, and the like, and mixtures thereof. All of these acids contain at least one aromatic nucleus. Acids containing fused rings can also be present, such as in 1,4-, 1,5-, or 2,6-naphthalene dicarboxylic acids. Preferred dicarboxylic acids include terephthalic acid, isophthalic acid, naphthalene dicarboxylic acids, and the like, and mixtures comprising at least one of the foregoing dicarboxylic acids.

The aliphatic or alicyclic polyols include glycols, such as ethylene glycol, propylene glycol, butanediol, hydroquinone, resorcinol, trimethylene glycol, 2-methyl-1,3-propane glycol, 1,4-butanediol, hexamethylene glycol, decamethylene glycol, 1,4-cyclohexane dimethanol, or neopentylene glycol.

Also contemplated herein are the above polyesters with minor amounts, e.g., about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 to Whinfield et al., and 3,047,539 to Pengilly.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like.

The flame retardant polyester composition includes a flame retarding quantity of one or a mixture of nitrogen-containing flame retardants such as triazines, guanidines, cyanurates, and isocyanurates. Preferred triazines have the formula (2):

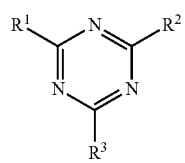

(2)

wherein $R^1$, $R^2$, and $R^3$ are independently $C_1$-$C_{12}$ alkyl, $C_1$-$C_{12}$ alkoxyl, $C_6$-$C_{12}$ aryl, amino, $C_1$-$C_{12}$ alkyl-substituted amino, or hydrogen. Highly preferred triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Preferred cyanurate/isocyanurate compounds include salts/adducts of the triazine compounds with cyanuric acid, such as melamine cyanurate and any mixtures of melamine salts.

Preferred guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardant may be present in the composition at about 1 to about 25 weight percent, based on the total weight of the composition. Within this range, it is preferred to use at least about 5 weight percent, even more preferably at least about 8 weight percent of the nitrogen-containing flame retardant. Also within this range, it is be preferred to use UP to about 20 weight percent.

The nitrogen-containing flame-retardants are used in combination with one or more phosphinic acid salts. The phosphinates and diphosphinates include those set forth in U.S. Pat. No. 6,255,371 to Schosser et al. The specification of this patent, column 1, line 46 to column 3 line 4 is incorporated by reference into the present specification. Specific phosphinates mentioned include aluminum diethylphosphinate (DE-PAL), and zinc diethylphosphinate (DEPZN). The phosphinates have the formula (I) $[(R^1)(R^2)(PO)-O]_m{}^-M^{m+}$ and formula II $[(O-POR^1)(R^3)(POR^2-O)]_n{}^{2-}M_x{}^{m+}$, and or polymers comprising such formula I or II, where $R^1$ and $R^2$ are identical or different and are H, $C_1$-$C_6$-alkyl, linear or branched, and/or aryl; $R^3$ is $C_1$-$C_{10}$, alkylene, linear or branched, $C_6$-$C_{10}$-arylene, -alkylarylene or -arylalkylene; M is any metal, but preferred are magnesium, calcium, aluminum or zinc, m is 1, 2 or 3; n is 1, 2 or 3; x is 1 or 2. The structures of formula I and II are specifically incorporated by reference from the Schosser patent into the present application. Note that $R^1$ and $R^2$ can be H, in addition to the substituents referred to set forth in the patent. This results in a hypophosphite, a subset of phosphinate, such as calcium hypophosphite, aluminum hypophosphite and the like.

The charring polymer is a polymer that has not more than about 85% weight loss at 400-500 degrees Centigrade upon heating under nitrogen using a thermogravimetric analysis (TGA) at a heating rate of 20 Centigrade degrees per minute. Typical charing polymers include polyetherimides, poly(phenylene ether), poly(phenylenesulfide), polysulphones, polyethersulphones, poly(phenylenesulphide oxide (PPSO), polyphenolics (e.g. Novolac). The charring polymer is present in an amount from about 0.1 to about 15 percent by weight of the composition.

The compositions may, optionally, further comprise a reinforcing filler. Suitable reinforcing fillers include silica; silicates such as talc or mica; carbon black; and reinforcing fibers, such as carbon fiber, aramide fiber, glass fiber, and the like; and mixtures comprising at least one of the foregoing fillers. In a preferred embodiment, the reinforcing filler comprises glass fibers. For compositions ultimately employed for electrical uses, it is preferred to use fibrous glass fibers comprising lime-aluminum borosilicate glass that is relatively soda free, commonly known as "E" glass. However, other glasses are useful where electrical properties are not so important, e.g., the low soda glass commonly known as "C" glass. The glass fibers may be made by standard processes, such as by steam or air blowing, flame blowing and mechanical pulling. Preferred glass fibers for plastic reinforcement may be made by mechanical pulling. The diameter of the glass fibers is generally about 1 to about 50 micrometers, preferably about 1 to about 20 micrometers. Smaller diameter fibers are generally more expensive, and glass fibers having diameters of about 10 to about 20 micrometers presently offer a desirable balance of cost and performance. The glass fibers may be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of about one-eighth to about 2 inches long, which usually results in filament lengths between about 0.0005 to about 0.25 inch in the molded compounds. Such glass fibers are normally supplied by the manufacturers with a surface treatment compatible with the polymer component of the composition, such as a siloxane, titanate, or polyurethane sizing, or the like.

When present in the composition, the reinforcing filler may be used at about 10 to about 60 weight percent, based on the total weight of the composition. Within this range, it is preferred to use at least about 20 weight percent of the reinforcing filler. Also within this range, it is preferred to use up to about 50 weight percent, more preferably up to about 40 weight percent, of the reinforcing filler.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as, for example, poly(tetrafluoroethylene), tetrafluoroethylene/hexafluoropropylene copolymers, tetrafluoroethylene/ethylene copolymers, polyvinylidene fluoride, poly(chlorotrifluoroethylene), and the like, and mixtures comprising at least one of the foregoing anti-dripping agents. A preferred anti-dripping agent is poly(tetrafluroethylene). When used, an anti-dripping agent is present in an amount of about 0.02 to about 2 weight percent, and more preferably from about 0.05 to about 1 weight percent, based on the total weight of the composition.

The compositions may, optionally, further comprise other conventional additives used in polyester polymer compositions such as non-reinforcing fillers, stabilizers, mold release agents, plasticizers, and processing aids. Other ingredients, such as dyes, pigments, anti-oxidants, and the like can be added for their conventionally employed purposes.

The compositions can be prepared by a number of procedures. In an exemplary process, the polyester composition, optional amorphous additives, impact modifier and filler and/or reinforcing glass is put into an extrusion compounder with resinous components to produce molding pellets. The resins and other ingredients are dispersed in a matrix of the resin in the process. In another procedure, the ingredients and any reinforcing glass are mixed with the resins by dry blending, and then fluxed on a mill and comminuted, or extruded and chopped. The composition and any optional ingredients can also be mixed and directly molded, e.g., by injection or transfer molding techniques. Preferably, all of the ingredients are freed from as much water as possible. In addition, compounding should be carried out to ensure that the residence time in the machine is short; the temperature is carefully controlled; the friction heat is utilized; and an intimate blend between the resin composition and any other ingredients is obtained.

Preferably, the ingredients are pre-compounded, pelletized, and then molded. Pre-compounding can be carried out in conventional equipment. For example, after pre-drying the polyester composition (e.g., for about four hours at about 120° C.), a single screw extruder may be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) may be fed downstream. In either case, a generally suitable melt temperature will be about 230° C. to about 300° C. The pre-compounded composition can be extruded and cut up into molding compounds such as conventional granules, pellets, and the like by standard techniques. The composition can then be molded in any equipment conventionally used for thermoplastic compositions, such as a Newbury type injection molding machine with conventional cylinder temperatures, at about 230° C. to about 280° C., and conventional mold temperatures at about 55° C. to about 95° C. The compositions provide an excellent balance of impact strength, and flame retardancy.

An additional preferred embodiment encompasses molded articles made from the composition, such as electric and electronic parts, including, for example, connectors, circuit breakers, and power plugs.

It should be clear that the invention encompasses reaction products of the above described compositions.

The invention is further illustrated by the following non-limiting examples.

EXAMPLES AND COMPARATIVE EXAMPLES

All formulations are made by dry-blending of ingredients with the exception of tetraphenyl BPA-diphosphate (BPA-DP) and glass fiber. The blends are subsequently compounded on a Werner-Pfleiderer 25 mm co-rotating extruder, where BPA-DP and glass were fed separately downstream of the blend. The extruder temperature settings (upstream to downstream) were 50-140-265-260-260-260-260-260-275° C.; a vacuum of 0.45 bar was applied and the screw rotation rate was 300 RPM.

Molding of parts was performed on a 35 ton Engel injection molding machine with temperature settings of 245-255-265-265° C. (from throat to nozzle) and a mold temperature of 70° C. for the PBT-based formulations. Prior to molding the pellets were pre-dried at 120° C. for 2-4 hrs.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

Test specimens were evaluated for Izod unnotched Impact (IUI) strength in accordance with ISO 180, and results are expressed in units of kJ/m$^2$. UL94 testing was employed for the flame retardance testing. The tensile strength was evaluated using ISO527. The polybutylene terephthalate (PBT) employed was GE's PBT-315 and GE's PBT-195, used in the weight ratio of 2:1. MC-25 is melamine cyanurate from Ciba. TSAN is available from GE and is a fibrillating type Teflon in styrene acrylonitrile. BPA-DP is bisphenol A diphosphate from Albemarle. PPO is polyphenylene oxide from GE (polyphenylether of 2,6-xylenol). Ultem 1010 is polyetherimide from GE. Standard stabilizers are used such as Irganox 1010 and/or epoxy. Standard pigments employed include zinc sulfide.

The results of the different formulations are mentioned in the table.

| Composition | A | B | C | 1 | 2 | D | E | 3 | F | 4 | G | 5 |
|---|---|---|---|---|---|---|---|---|---|---|---|---|
| PBT | 33.55 | 33.55 | 41.55 | 36.55 | 36.55 | 45.55 | 47.55 | 41.55 | 51.55 | 47.55 | 49.35 | 42.35 |
| MC-25 | 10 | 10 | 12.5 | 12.5 | 12.5 | 10 | 10 | 10 | 10 | 10 | 10 | 10 |
| TSAN | 0.5 | 0.5 | 0.5 | 0.5 | 0.5 | 0.5 | 0.5 | 0.5 | 0.5 | 0.5 | 0.5 | 0.5 |
| Ultem-1010 | 5 | | | 5 | | | | 5 | | 5 | | 5 |
| PPO-803 | | 5 | | | 5 | | | | | | | |
| BPA-DP | 18 | 18 | | | | | | | | | | |
| Zn-salt of diethylphosphinic acid | | | 12.5 | 12.5 | 12.5 | 15 | 15 | 15 | 10 | 10 | | |
| Calcium hypophosphite | | | | | | | | | | | 15 | 15 |
| Stabilizers | 1.15 | 1.15 | 1.15 | 1.15 | 1.15 | 2.15 | 0.15 | 1.15 | 1.15 | 0.15 | 0.15 | 2.15 |
| Pigments | 1.8 | 1.8 | 1.8 | 1.8 | 1.8 | 1.8 | 1.8 | 1.8 | 1.8 | 1.8 | | |
| Glass Fibers | 30 | 30 | 30 | 30 | 30 | 25 | 25 | 25 | 25 | 25 | 25 | 25 |
| IUI (kJ/m2) | 35.1 | 29.1 | 22.4 | 22.6 | 14.2 | 24.86 | 26.95 | 30.49 | 35.11 | 37.62 | 28.4 | 24 |
| UL @ 1.5 | V0 | NC | V0 | V0 | V0 | V1 | V1 | V0 | NR | V1 | V1 | V0 |
| UL @ 0.8 | | | V1 | V0 | V0 | V2 | V2 | V1 | NR | NR | V2 | V2 |
| Tensile strength retention after 1 week aging at 140 C. | <50% | <50% | >80% | >80% | >80% | >80% | >80% | >80% | >80% | >80% | >80% | >80% |

Comparative samples A and B show that by using a P-compound as BPA-DP no good thermal stability good be obtained; the tensile strength retention after 1 week at 140 C is lower than 50%. For the formulations based on a phosphinate this retention is higher than 80%.

Samples 1 and 2, belonging to the invention show that the UL-performance at 0.8 mm is V0, in contrast with comparative sample C. So the addition of a charring polymer gives better UL-performance, while the tensile strength retention is still good. The charring polymer Ultem (Polyetherimide from GE) is preferred over PPO due to higher impact values.

Upon using lower amounts of melamine cyanurate it can be seen that the impact improves, but a charring polymer (formulation 3) is needed to maintain a V0 performance at 1.5 mm; the comparative samples D and E result only in a V1 performance. Upon further lowering the flame retardant amounts, in this case the phosphinate amount, it can be seen that the UL-performance drops to NC (non-classified) or NR (not-rated) for comparative sample F, but for sample 4 the material still has a V1 performance. Also in the case of calcium hypophosphite (calcium phosphinate) addition of a charring polymer (formulation 5) result in better UL-performance without negative effects on the tensile strength retention.

From the results it can be concluded that a combination of a phosphinate compound with a charring polymer, in the presence of a nitrogen compound, gives the best balance in properties as UL-performance and tensile strength retention upon oven aging. Without the charring agent or in case of another Phosphorus compound (as BPA-DP) these results could not be obtained.

The invention claimed is:

1. A composition consisting of, based on total weight of the composition:
   a. from about 20 to about 90 weight percent of a polyester; from about 1 to about 25 weight percent of a nitrogen-containing flame retardant selected from the group consisting of triazines, guanidines, cyanurates, isocyanurates, and mixtures thereof;
   b. from 1 to 30 weight percent of a phosphinate, diphosphinate and/or a polymer derived from a phosphinate or diphosphinate;
   c. from about 10 to about 60 weight percent of a reinforcing filler selected from the group consisting of silica, talc, mica, carbon black, carbon fiber, aramide fiber, glass fiber, and combinations thereof;
   d. from 0.1 to about 15 percent by weight, of a polyetherimide, where the polyetherimide contains only polyetherimide units; and
   e. optionally, an additive selected from the group consisting of anti-dripping agent, non-reinforcing filler, stabilizer, mold release agent, plasticizer, dye, pigment, anti-oxidant, and combinations thereof;
wherein a 1.5 mm thick sample molded from the composition has a UL94 flammability rating of V0.

2. The composition of claim 1 wherein said phosphinate or diphosphinates have the formula (I) $[(R^1)(R^2)(PO)-O]_m^- M_m^+$ and formula II $[(O-POR^1)(R^3)(POR^2-O)]_n^{2-} M_x^{m+}$, and/or a polymer comprising formulas I or II, where $R^1$ and $R^2$ are identical or different and are H, $C_1$-$C_6$-alkyl, linear or branched, and/or aryl; $R^3$ is $C_1$-$C_{10}$-alkylene, linear or branched, $C_6$-$C_{10}$-arylene, -alkylarylene or -arylalkylene; M is a metal selected from the group consisting of magnesium, calcium, aluminum and zinc, m is 1, 2 or 3; n is 1, 2, or 3; x is 1 or 2.

3. The composition of claim 1 wherein the phosphinate is selected from the group consisting of aluminum diethylphosphinate, zinc diethylphosphinate, calcium hypophosphite, aluminum hypophosphite, and combinations thereof.

4. The composition of claim 1, wherein the polyetherimide has not more than about 85% weight loss at 400-500° C. upon heating under nitrogen using a thermogravimetric analysis (TGA) at a heating rate of 20° C. per minute.

5. The composition of claim 1 wherein the nitrogen-containing flame retardant is selected from the group consisting of melamine cyanurate, melamine polyphosphate, melamine pyrophosphate and mixtures thereof.

6. The composition of claim 1, wherein the molded sample has a thickness of 1.5 mm.

7. The composition of claim 1, wherein the molded sample has a thickness of 0.8 mm.

8. The composition of claim 1, wherein a sample molded from the composition retains higher than 80% of its initial tensile strength after aging one week at 140° C. when measured in accordance with ISO 527.

9. The composition of claim 1, wherein the polyester is present in an amount from about 25 to about 90 percent by weight.

10. The composition of claim 1, wherein the polyester is present in an amount from about 30 to about 90 percent by weight.

11. The composition of claim 1, wherein the nitrogen-containing flame retardant is present in an amount from about 5 to about 25 percent by weight.

12. The composition of claim 1, wherein the nitrogen-containing flame retardant is present in an amount from about 8 to about 25 percent by weight.

13. The composition of claim 1, wherein the phosphinate or diphosphinate is present in an amount from 3 to 20 percent by weight.

14. The composition of claim 1, wherein the phosphinate or diphosphinate is present in an amount from 3 to 15 percent by weight.

15. The composition of claim 1, wherein the composition comprises about 20 to about 60 weight percent of the reinforcing filler.

16. The composition of claim 1, wherein the polyester is derived from a glycol component, and an acid component consisting of at least about 70 mole % terephthalic acid or polyester-forming derivatives thereof and up to about 30 mole % of another acid selected from the group consisting of isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4-diphenoxyethanedicarboxylic acid, sebacic acid, adipic acid, and combinations thereof.

17. The composition of claim 16, wherein the glycol component contains a mixture of tetramethylene glycol and up to 30 mole % of another glycol selected from the group consisting of ethylene glycol, trimethylene glycol, 2-methyl-1,3-propane glycol, hexamethylene glycol, decamethylene glycol, cyclohexane dimethanol, neopentylene glycol, and combinations thereof.

18. A method of forming an article, comprising shaping by extruding, injection molding or transfer molding the composition of claim 1 to form the article.

19. A method of forming a composition, comprising melt blending the components of the composition of claim 1.

20. An article comprising the composition of claim 1.

21. The article of claim 20, wherein the article is an extruded or injection molded article.

22. The article of claim 20, in the form of an electric or electronic part.

23. The article of claim 22, wherein the electronic part is a connector, circuit breaker or power plug.

24. The composition of claim 1, wherein a 0.8 mm thick sample molded from the composition has a UL94 flammability rating of V0.

25. The composition of claim 1, wherein the anti-dripping agent is a fluorine-containing polymer present in an amount of about 0.02 to about 2 weight percent, based on the total weight of the composition.

26. A composition consisting of, based on total weight of the composition:
   a. from about 25 to about 90 weight percent of a polyester derived from terephthalic acid or polyester-forming derivatives thereof, and a glycol component;
   b. from about 1 to about 25 weight percent of melamine cyanurate;
   c. from 1 to 30 weight percent of a phosphinate or diphosphinates and/or their polymers;
   d. from about 10 to about 60 weight percent of a reinforcing filler selected from the group consisting of silica, talc, mica, carbon black, carbon fiber, aramide fiber, glass fiber, and combinations thereof;
   e. from 0.1 to about 15 percent by weight of a polyetherimide wherein the polyetherimide contains only polyetherimide units; and
   f. optionally, an additive selected from the group consisting of anti-dripping agent, non-reinforcing filler, stabilizer, mold release agent, plasticizer, dye, pigment, anti-oxidant, and a combination thereof;

wherein a 1.5 mm or a 0.8 mm thick sample of the molded composition has a UL94 flammability rating of V0.

27. The composition of claim 26, wherein the polyester is poly(butylene terephthalate).

* * * * *